United States Patent
Huether

[15] 3,658,697
[45] Apr. 25, 1972

[54] CHEMICAL COAGULATION OF CARBON TREATED WASTE WATER

[72] Inventor: Charles H. Huether, Clifton Forge, Va.
[73] Assignee: Westvaco Corporation, New York, N.Y.
[22] Filed: July 31, 1970
[21] Appl. No.: 60,063

[52] U.S. Cl. ................................210/18, 210/20, 210/28, 210/40
[51] Int. Cl. ..........................................C02c 5/02
[58] Field of Search ....................210/20, 26–28, 210/39, 40, 48, 18, 52

[56] References Cited

UNITED STATES PATENTS

| | | | |
|---|---|---|---|
| 3,419,493 | 12/1968 | Pangle | 210/45 X |
| 3,252,899 | 5/1966 | Rice et al. | 210/40 |
| 3,436,344 | 4/1969 | Canning et al. | 210/39 |
| 3,455,820 | 7/1969 | Joyce et al. | 210/40 |

OTHER PUBLICATIONS

Weber et al., Kinetics of Absorption in Columns of Fluidized Media, Jour. Water Poll. Control Fed., 37, 425 (1965)
Parsons, Chemical Treatment of Sewage and Industrial Wastes, National Lime Assn., 1965, pp. 8–12
Weber et al., Physiochemical Treatment of Wastewater, Jour Water Poll. Control Fed., 42, 83 (1970)

*Primary Examiner*—Reuben Friedman
*Assistant Examiner*—Thomas G. Wyse
*Attorney*—W. Allen Marcontell and Richard L. Schmalz

[57] ABSTRACT

A process for separating water from sewage includes the steps of subjecting raw sewage to a primary treatment for removing certain suspended solids and thereafter passing the effluent up through a column containing an activated carbon bed under anerobic biological conditions with sufficient velocity to expand the activated carbon bed. Subsequent to adsorbent contacting, effluent from the activated carbon column is then treated with a mixture of chemical flocculants to coagulate the suspended solids and bind the sulfides with a soluble salt to inhibit or prevent the escape of noxious hydrogen sulfide. Floc is allowed to form and is separated from the supernatant.

15 Claims, 1 Drawing Figure

Patented April 25, 1972
3,658,697
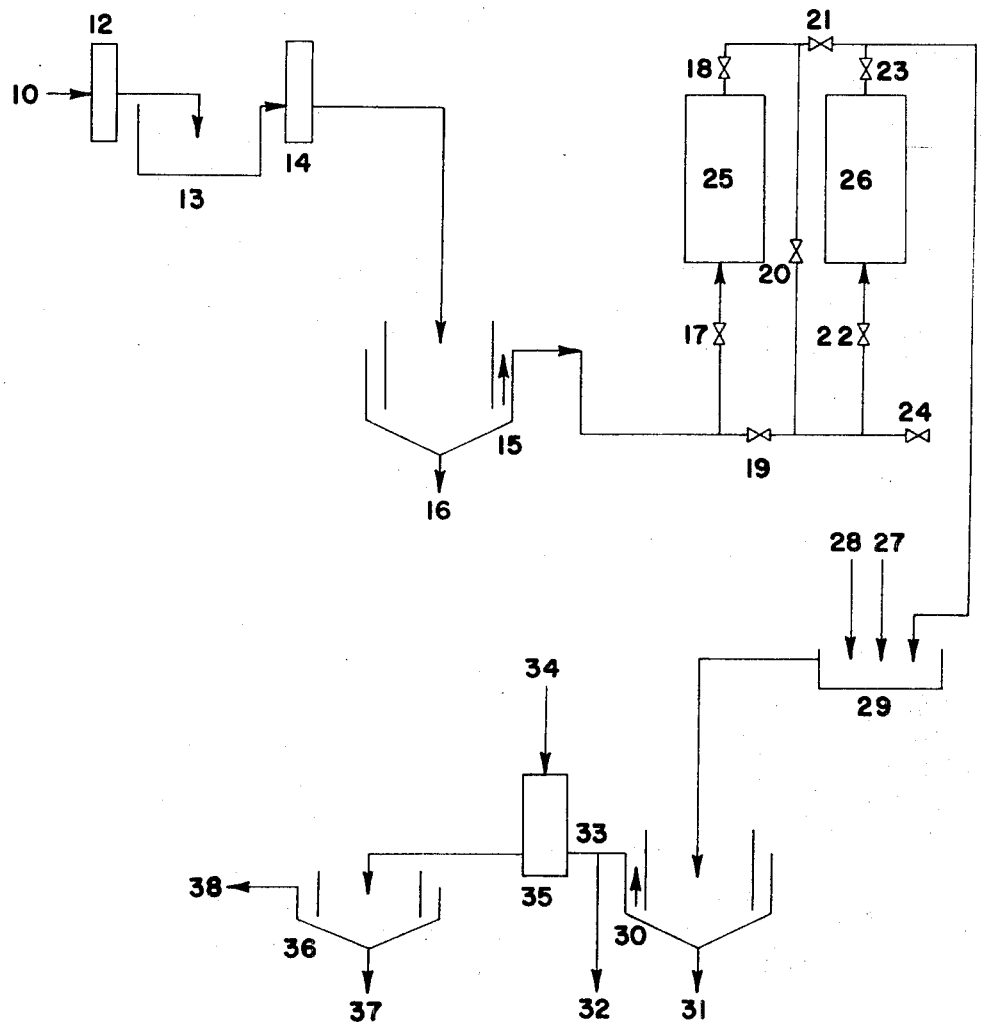
INVENTOR.
CHARLES H. HUETHER
BY James L. Neal

CHEMICAL COAGULATION OF CARBON TREATED WASTE WATER

BACKGROUND OF INVENTION

The need for economical and rapid methods for treating waste waters to remove pollutants therefrom is steadily increasing. This need results in part from both increase in per capita consumption of water and increase in population. The increase in the amount of water used results in corresponding increase in the amount of sewage to be disposed of. The increased use of water and the corresponding increase in the amount of waste water produced necessitates purification of waste waters for at least two reasons. First, there is an ever increasing problem of disposing of waste waters which have customarily been discharged into streams with consequent pollution of the streams. The result today is overburdened and over polluted streams in many parts of the country. A second reason arises from the increased need of usable water with treated waste water providing one source of supply.

Two primary sources of sewage are household wastes and industrial wastes. Municipal sewage is often a mixture the two and the ratio of household waste to industrial wastes making up municipal sewage is variable. Objectionable wastes carried by sewage generally fall in the catagories of suspended solids and dissolved solids. The first treatment given sewage is one to remove the suspended solids which are most easily settled or removed. This is designated primary treatment and is followed by a further removal of suspended solids or removal of dissolved solids or both designated secondary treatment. Any subsequent purification is designated teritary treatment. Primary treatment typically includes screening, settling and comminuting devices and certain types of filters while other types of filters, various biological treatment steps and adsorption treatment steps including activated carbon adsorption treatment steps often characterize secondary and tertiary treatment. Settling, screening, comminuting and filtering generally remove suspended solids. Bacteriological treatment steps and steps involving adsorption and more particularly directed toward removal of dissolved solids, though some adsorption steps do effect removal of suspended solids.

Activated carbon may either be mixed with effluent to adsorb dissolved solids and subsequently removed therefrom with the contaminants. Alternatively the fluid may be passed through a bed or beds of activated carbon for adsorption of dissolved contaminants therefrom. Powdered activated carbon has been generally used for the former treatment process while granular activated carbon is preferred for the latter. Activated carbon beds tend to provide a dual function since the activated carbon particles serve to filter suspended solids from the effluent passing through the beds. The activated carbon beds must be periodically backwashed to remove these suspended solids and, in addition, the activated carbon must either be replaced or regenerated at intervals to restore its adsorptive capacity.

Activated carbon beds through which sewage effluent is passed operate, after a period of time, under conditions which support anerobic bacteriological activity which produces hydrogen sulfide.

It is therefore a primary object of the invention to provide an economical, efficient process for rapidly separating water from sewage.

It is a further object of this invention to provide an improved process for treating sewage wherein effluent from a primary sewage treatment stage is passed through a bed of activated carbon and the requirement for backwashing the activated carbon bed between carbon regenerations is greatly reduced.

It is also an object of this invention to provide a process for separating water from sewage which includes the passage of effluent from which easily settleable suspended solids have been removed through an activated carbon bed without release of hydrogen sulfide from the system.

SUMMARY OF THE INVENTION

The present invention involves a process for the treatment of sewage containing both suspended and dissolved solids. The process includes the steps of mechanically removing a portion of the suspended solids from the raw sewage and then passing the effluent from this mechanical removal step up through at least one bed of activated carbon so that the passage of the fluids through the bed expands the bed. This permits adsorption of the dissolved solids in the effluent. From the activated carbon beds the effluent has added thereto a chemical flocculant. Floc is allowed to form. A supernatant is then separated from the floc.

An expanded carbon bed is one wherein the net downward force of the carbon particles resulting from gravity is reduced by the upward flow of fluid through the bed. The volume of an expanded bed is increased over the volume of the same bed when settled. The passage of the effluent through the expanded bed of carbon permits dissolved solids to be adsorbed therefrom by the activated carbon while permitting the passage through the carbon bed of substantially all of the suspended solids remaining in the effluent. These suspended solids are removed by the subsequent flocculation step.

Biological reaction taking place in the activated carbon bed results in the generation of solids at the surface of the carbon particle. A portion of these solids flake off and pass from the activated carbon bed as additional suspended solids in the effluent. [See "Physiochemical Treatment of Wastewater," Weber, W. J., Jr., Hopkins, C. B., Bloom, R., Jr., *Jour. Water Pollu. Control Fed.*, Vol. 42, pp. 83–99 (Jan. 1970)] The biological reaction taking place in the activated carbon bed also results in the generation of hydrogen sulfide which passes from the carbon bed with the effluent. The subsequent flocculation step serves to remove the hydrogen sulfide and suspended solids passing through the activated carbon bed and those generated therein.

BRIEF DESCRIPTION OF THE DRAWING

The drawing is a schematic flow diagram illustrating apparatus capable of performing a preferred embodiment of this invention.

DETAILED DESCRIPTION OF THE PREFERRED EMBODIMENT

Raw sewage enters the treatment plant through conduit 10 and passes first through a primary treatment system for removal of gross settleable suspended solids, usually by mechanical means such as clarification or other gravitational settling, screening and filtering. The primary treatment system shown in the drawing includes a bar screen 12, a grit chamber 13, a comminuter 14 and a clarifier 15. The sewage passes through the bar screen 12 where certain large solids are removed and then into the grit chamber 13. From the grit chamber, the sewage passes through a comminuter 14 which reduces the size of the larger remaining solids and thence into a clarifier 15 for further removal of suspended solids. Solids collected in clarifier 15 are removed at solids removal means 16. The effluent from the primary treatment is then pumped, in an upflow mode, through a pair of substantially vertical columns containing activated carbon beds 25 and 26. Any number of carbon adsorbers may be used and connected either in parallel or in series. If the two activated carbon beds shown in the drawing are to be connected in parallel so the effluent will divide to flow through both simultaneously, valves 17, 18, 19, 21, 22, and 23 are opened and valves 20 and 24 are closed. If the activated carbon adsoprtion beds are to be connected in series so that the effluent will flow first through the adsorption bed 25 and then through the adsorption bed 26, valves 17, 18, 20, 22 and 23 are opened and valves 19, 21 and 24 are closed.

Flow of the effluent up through the carbon beds is carried out at a velocity sufficiently high to expand the beds. In this manner contact between the effluent and the activated carbon particles permits adsorption by the activated carbon of solids dissolved in the effluent while permitting suspended solids remaining in the effluent to pass through the activated carbon beds. Connection of the activated carbon beds in parallel permits an increase in the volume of effluent capable of being passed through the beds for a given fluid velocity and time as compared to the flow volume passing through the beds when the beds are connected in series and operated at the same fluid velocity for the same time interval. Connection in series, of course, increases the contact time of the effluent with the activated carbon. For example, in the illustrated preferred embodiment the beds are identical and the contact time is multiplied by a factor equaling the number of beds, that is, the contact time is doubled.

From the activated carbon beds 25 and 26 effluent passes to a flocculation tank 29 where a chemical flocculating agent 27, which may be a heavy metal salt or a heavy metal salt in combination with a polyelectrolyte, is added to the effluent to produce flocculation. Calcium and aluminum salts are other salts usable as flocculants. If necessary, sodium hydroxide 28 may be added to the flocculation tank to adjust the alkalinity to aid in floc production. Effluent from the flocculating tank 29 passes into a clarifier 30 where the floc settles and is removed from the clarifier by means 31. The supernatant is drawn off and may then pass from the system through the conduit 32.

Calcium hydroxide (lime) may be used as a flocculant but it tends to raise the alkalinity to an objectionably high level. When lime is used as a flocculant, it is usually desirable to lower the alkalinity of the clarifier effluent before it is discharged either as waste or for ultimate reuse. To lower the alkalinity, instead of discharging the effluent through conduit 32, the effluent is passed through conduit 33 to a neutralizing tank 35 where it is treated with carbon dioxide or sulfuric acid. Thereafter, separation of excess calcium salts is effected in the clarifier 36. Calcium salts are removed by removal means 37 and the final effluent passes from the system through conduit 38.

The process of this invention is useful for purifying waste waters generally. It is particularly useful for household waste water, industrial waste water and municipal waste water which may contain a mixture of both household and industrial waste waters. Such waste waters are herein designated as sewage.

Effluent from the primary treatment system flows up through the activated carbon beds 25 and 26 with a velocity sufficient to expand the beds. This is necessary to avoid filtration by the carbon beds of suspended solids in the effluent. If such filtration is allowed to occur, the pressure drop across the bed required to produce a certain volume of flow per unit of time is increased. Solids retained in the beds eventually cause clogging of the beds. When activated carbon beds retain suspended solids, periodic backwashing is required for continued effective use. Backwashing is expensive and time consuming. It greatly reduces the efficiency of the activated carbon beds and the system as a whole. However, when the beds are expanded it is found that filtration of suspended solids is substantially eliminated. The minimum velocity required for flow of fluid through the activated carbon bed is therefore that velocity which will cause the bed to expand. When a granular activated carbon bed is used, a superficial velocity of six gallons per minute per square foot (6 gpm/ft.$^2$) causes expansion of the bed. A preferred maximum superficial velocity was found to be 10 gpm/ft.$^2$, but higher superficial velocities may be used.

After passage of the effluent from the activated carbon beds 25 and 26 to the flocculating tank 29, any of the known flocculating agents may be added to produce flocculation. These flocculating agents may be inorganic, organic or a combination of the two. The following are specific examples of inorganic flocculants which may be used: calcium oxide (lime), calcium hydroxide (slaked lime), calcium carbonate, sodium aluminate, aluminum sulfate and other aluminum compounds generally designated as alum, titanium tetrachloride, and water soluble heavy metal salts. Heavy metal salt flocculants are those metal salt flocculants which are capable of forming insoluble precipitates with sulfides. A test for heavy metal salts in general is set forth in *The Pharmacopeia of the United States of America*, U.S. Pharmacopeia Convention Inc., Washington, D. C., 16th Revision, pp. 944 (1960). Examples of effective water soluble heavy metal salts are: ferric chloride, ferric sulfate, ferrous chloride, ferrous sulfate, ferrous acetate, ferrous bromide, ferric bromide, cupric sulfate cuprous sulfate and cupric chloride. The heavy metal salts are particularly effective in removal of hydrogen sulfide from the effluent since the sulfur containing compound formed during flocculation precipitates. With at least some of the other flocculants, the sulfur containing compound remains in solution with the effluent. Water soluble heavy metal salts and other inorganic flocculants may be used in conjunction with each other in the following manner. The heavy metal salt, for example, ferric chloride, is used to treat the effluent in a quantity sufficient to precipitate hydrogen sulfide but not sufficient to produce the desired flocculation. Thereafter another inorganic flocculent, such as lime, may be used in any quantity necessary to produce further flocculation. Certain of the aluminum containing compounds, when used to produce floc and remove hydrogen sulfide, may cause an unpleasant order resulting from the formation of aluminum sulfide. Accordingly, for general use, flocculants other than the aluminum containing compounds are preferred. Iron salts are economical and therefore preferred.

Organic flocculants suitable for use with the inorganic flocculants to produce flocculation and effect hydrogen sulfide removal comprise natural and synthetic polyelectrolytes which may be anionic, cationic or nonionic.

Organic flocculants include proteins and protein products, gluten, starches and casein, such as are discussed, at pages 26–37, in *Evaluation of Various Adsorbants and Coagulants for Waste Water Renovation*; U.S. Department of Health, Education, and Welfare; Public Health Service; Division of Water Supply and Pollution Control; (June, 1964). Polyelectrolyte flocculants and other flocculants suitable for use with the process of this invention are disclosed in the following U.S. Pats. Nos.: 2,264,488; 2,995,512; 3,023,162; 3,055,827; 3,142,638; 3,157,595; 3,171,805; 3,210,308; 3,214,370; 3,235,493; 3,252,899; 3,285,839; 3,288,707 and 3,455,820. Polyelectrolyte flocculants for use in sewage treatment systems are also disclosed in "Natural and Synthetic Polyelectrolytes as Coagulant Aids" by Jesse M. Coan, George A. Rourke and Richard L. Woodward (*Journal of the American Water Works Association*; Vol. 50, No. 4; page 53; April, 1958). The above designated U.S. Patents and Publications are incorporated herein by reference.

The above flocculants described in and incorporated by reference into this specification are by way of example only and are not intended to provide a complete list of all flocculants which may be used.

If the alkalinity of the flocculation tank is to be adjusted, any inorganic base may be used to raise the pH. Preferred inorganic bases are calcium hydroxide and sodium hydroxide.

The activated carbon beds for use with this invention may be of any granular activated carbon. Granular carbon having a surface area between 300 and 1,500 sq. meters per gram and a U.S. Sieve mesh size of between 6 and 80 is preferred. Examples of preferred activated carbons in these ranges are those designated Nuchar WV–G, Nuchar WV–L and Nuchar Wv–W, manufactured by Westvaco Corporation. The activated carbon is to be regenerated or replaced as necessary.

The length of time which the sewage effluent is in contact with the activated carbon and the concentration of the flocculants added to the effluent to effect flocculation and hydrogen sulfide removal will depend upon the concentration of contaminants in the raw sewage and the degree of purification desired. In the preferred embodiment, however, it has been found that, after passage of the effluent through the activated carbon beds, the addition of less than 75 p.p.m. of heavy metal salt flocculant will effect hydrogen sulfide removal but will not produce the desired amount of flocculation. Most favorable results using inorganic flocculants only have been obtained by treating effluent from the activated carbon beds with flocculant concentrations of about 100 p.p.m. An inorganic flocculant concentration of 75 p.p.m. has been found satisfactory when a polyelectrolyte flocculant is also used in a concentration of at least 0.06 p.p.m.

The following example will illustrate without limiting the present invention.

EXAMPLE

Raw sewage was given primary treatment and the primary effluent was passed through 6 columns, each having an internal diameter of 2.9 inches and a length of 6 feet. These columns were arranged vertically and each contained 5 pounds of Nuchar WV–G 12 × 40 granular carbon manufactured by Westvaco Corporation. The columns were connected in series. Following the columns containing activated carbon, a station was provided for the addition of an inorganic flocculating agent and, downstream from this station, a station for the addition of polyelectrolyte flocculant was provided. The final treatment station comprising a filtration bed 6 inches in diameter and 5 feet high contained 23 inches of fine sand and 2 inches of No. 1 Anthracite for separating the floc from the supernatant. (A clarifier, a filtration bed or any equivalent may be used for separation of the floc from the supernatant.)

The primary effluent was passed up through the columns containing the activated carbon beds at superficial velocities between 6 gpm/ft.$^2$ and 8 gpm/ft.$^2$. After about 3 weeks of continuous operation, the carbon beds were operating under anaerobic conditions and hydrogen sulfide was being produced. After passage from the activated carbon beds, ferric chloride was added in a concentration of 100 p.p.m. and thereafter an anionic polyelectrolyte flocculant (Reten A–5, manufactured by Hercules, Inc. of Wilmington, Del.) in a concentration of 0.1 p.p.m. was used to treat the effluent. Sufficient mixing was effected after treatment with each of the above flocculants and thereafter the effluent passed to the sand and Anthracite filter. A 7 minute period of quiescent retention occurred before the effluent entered the filter media. After flocculation the presence of hydrogen sulfide was not detected. Further results are given in the table below:

Per Cent Pollutant Reduction

| Test | Carbon System Effluent | | Filter Effluent | |
|---|---|---|---|---|
| | COD | BOD | COD | BOD |
| Carbon Treatment of primary Effluent | 62 | 58 | | |
| Carbon Treatment of Primary Effluent with Filter Following Carbon System | 53 | 53 | 60 | 57 |
| Carbon Treatment of Primary Effluent with Filter Following Carbon System and Chemical Coagulation before Filter | 60 | 72 | 88 | 92 |

Biological oxygen demand (BOD) is the quantity of oxygen used in the biochemical oxidation of organic matter in 5 days at 20° C. Chemical oxygen demand (COD) is the quantity of oxygen expressed in ppm consumed, under specific conditions, in oxidation of oxidizable organics and inorganics contained in waste water. These parameters are explained in *Standard Methods for the Examination of Water and Waste Water*, 12 Edition; American Public Health Association, New York, New York (1965).

It is to be understood that the foregoing description is of a preferred embodiment and that the invention is not limited to the specific process shown and described. Therefore, changes may be made in the described preferred embodiment without departing from the scope of the invention.

I claim:
1. In combination with a process for separating dissolved and suspended contaminants from waste water comprising the steps of:
   a. mechanically separating settleable solids from said waste water;
   b. passing the effluent from step a) through an expanded bed activated carbon adsorption column to remove adsorbable dissolved contaminants;
   c. treating the effluent from said adsorption column with a flocculating agent to coagulate suspended solids in a supernatant, and
   d. separating said coagulated solids from said supernatant: the improvement comprising;
   a. operating said adsorption column under hydrogen sulfide generating anaerobic bacteriological conditions, and
   b. utilizing as a flocculating agent a soluble iron salt in an amount sufficient to precipitate dissolved hydrogen sulfide and coagulate said precipitate and said suspended solids in said supernatant.

2. The process according to claim 1 wherein said effluent from said activated carbon bed is treated with said flocculating agent in a concentration of at least 75 p.p.m. of said soluble iron salt and 0.06 p.p.m. of polyelectrolyte flocculant.

3. The process according to claim 2 wherein said polyelectrolyte flocculant is anionic.

4. The process according to claim 1 wherein said effluent from said activated carbon bed is treated with said flocculating agent in a concentration of at least 100 ppm of said soluble iron salt.

5. A process for removing water from sewage comprising the steps of: a. removing readily settleable suspended solids from raw sewage; b. passing the effluent from which said readily settleable suspended solids have been removed up through at least one activated carbon bed under hydrogen sulfide generating anaerobic bacteriological conditions with sufficient velocity to cause said activated carbon bed to expand for adsorbing dissolved solids from said effluent while permitting the suspended solids which remained in said effluent to pass through said activated carbon bed;
   c. treating the effluent from said activated carbon bed with a sufficient quantity of a flocculating agent comprising a soluble iron salt to precipitate dissolved hydrogen sulfide and coagulate said precipitate and said suspended solids in a supernatant; and
   d. separating said precipitates and said floc from said supernatant.

6. The process according to claim 5 wherein said effluent from which readily settleable suspended solids have been removed is passed up through said carbon bed with a superficial velocity of at least 6 gpm/ft.$^2$.

7. The process according to claim 5 wherein said effluent from said activated carbon bed is treated with said flocculating agent in a concentration of at least 100 ppm of said soluble iron salt.

8. The process according to claim 5 wherein said effluent from said activated carbon bed is treated with a flocculating agent having a concentration of at least 75 p.p.m. of said soluble iron salt and at least 0.06 p.p.m. of a polyelectrolyte flocculating agent.

9. The process according to claim 8 wherein said polyelectrolyte flocculating agent is anionic.

10. The process according to claim 5 wherein said step of treating said effluent from said activated carbon bed with a flocculating agent comprises the steps of:
    a. treating said effluent from said carbon bed with a water soluble iron salt to precipitate dissolved hydrogen sulfide; and
    b. treating said effluent from said carbon bed with either lime or slaked lime to produce flocculation.

11. The process according to claim 5 further comprising the step of adding an inorganic base to said flocculating agent to adjust the alkalinity for aiding flocculation.

12. The process according to claim 5 wherein said effluent from which readily settleable suspended solids have been removed is passed through a plurality of activated carbon beds connected in series.

13. The process according to claim 12 wherein said activated carbon beds contain granular activated carbon.

14. The process according to claim 5 wherein said activated carbon bed contains granular activated carbon.

15. A process for removing water from sewage comprising the steps of:
   a. removing readily settleable suspended solids from raw sewage;
   b. passing the effluent from which readily settleable suspended solids have been removed up through at least one activated carbon column at a superficial velocity of at least 6 gallons per minute per square foot, under hydrogen sulfide generating, anaerobic biological reaction conditions, for adsorbing dissolved solids from said effluent while permitting the suspended solids remaining in said effluent to pass through said activated carbon bed;
   c. treating said effluent from said activated carbon bed with at least 75 p.p.m. of a water soluble iron salt to precipitate dissolved hydrogen sulfide and at least 0.06 p.p.m. of an anionic polyelectrolyte flocculant to coagulate said precipitate and said suspended solids in a supernatant; and
   d. separating said coagulated matter from said supernatant.

* * * * *